(12) United States Patent
Misovski

(10) Patent No.: US 7,870,512 B2
(45) Date of Patent: Jan. 11, 2011

(54) USER INTERFACE (UI) PROTOTYPE USING UI TAXONOMY

(75) Inventor: Filip Misovski, Frankfurt (DE)

(73) Assignee: SAP AG, Walldorf (DE)

( * ) Notice: Subject to any disclaimer, the term of this patent is extended or adjusted under 35 U.S.C. 154(b) by 438 days.

(21) Appl. No.: 11/320,177

(22) Filed: Dec. 28, 2005

(65) Prior Publication Data

US 2007/0150805 A1    Jun. 28, 2007

(51) Int. Cl.
G06F 3/00 (2006.01)
(52) U.S. Cl. .................. 715/861; 715/234; 715/762; 715/764; 706/52
(58) Field of Classification Search .............. 715/762, 715/775, 764, 778, 234
See application file for complete search history.

(56) References Cited

U.S. PATENT DOCUMENTS

| | | | |
|---|---|---|---|
| 6,243,724 B1* | 6/2001 | Mander et al. ............. | 715/273 |
| 6,330,007 B1* | 12/2001 | Isreal et al. ................ | 715/762 |
| 6,360,227 B1* | 3/2002 | Aggarwal et al. .......... | 707/102 |
| 6,452,614 B1* | 9/2002 | King et al. ................. | 715/775 |
| 7,149,983 B1* | 12/2006 | Robertson et al. ......... | 715/810 |
| 2007/0112765 A1* | 5/2007 | Vishik ........................ | 707/5 |
| 2007/0156265 A1* | 7/2007 | McCoy et al. .............. | 700/83 |
| 2008/0103610 A1* | 5/2008 | Ebrom et al. .............. | 700/29 |
| 2008/0104114 A1* | 5/2008 | Kasperkiewicz et al. . | 707/104.1 |
| 2008/0154875 A1* | 6/2008 | Morscher et al. .......... | 707/5 |
| 2008/0168083 A1* | 7/2008 | Westerinen et al. ........ | 707/102 |

OTHER PUBLICATIONS

A Taxonomic Analysis of User-Interface Metaphors in the Microsoft Office Project Gallery; ACM International Conference Proceeding Series; vol. 104, Newcastle, Australia ,pp: 109-117,Year of Publication: 2005 , ISBN~ISSN:1445-1336 , 1-920682-22-8 , Pippin Barr, Rilla Khaled, James Noble and Robert L Biddle.*

Taxonomy generation for text segments; Oct. 2005, pp. 363-396 , ACM Transactions on Information Systems, Year of Publication: 2005, vol. 23, Issue 4 ISSN:1046-8188 , Author's, Shui Lung Lung Chuang and Lee Feng Feng Chien.*

Topic Taxonomy Adaption for Group Profiling, ACM Transactions on Knowledge Discovery from Data, vol. 1 , Issue 4 (Jan. 2008); Article No. 1 Year of Publication: 2008 ISSN:1556-4681 , Author's, Lei Tang, Huan Liu, Jianping Zhang, Nitin Agarwal and John James Salerno.*

(Continued)

*Primary Examiner*—William L Bashore
*Assistant Examiner*—Meseker Takele
(74) *Attorney, Agent, or Firm*—Schwegman, Lundberg & Woessner, P.A.

(57) ABSTRACT

A method of organizing user interface information in a computer system includes receiving a user's definition of at least a user interface (UI) layout and a UI principle, and creating a UI taxonomy that is an abstraction of a class of UIs being consistent with the UI layout and the UI principle. A computer system includes an application development software for a developer to create an application having a user interface (UI), and a UI taxonomy including a UI layout and a UI principle, the UI taxonomy being an abstraction of a class of UIs. The computer system provides a UI prototype to the developer in creating the UI for the application, the UI prototype being created using the UI taxonomy.

15 Claims, 11 Drawing Sheets

OTHER PUBLICATIONS

Manning, Harley, "How to Design Sites that Satisfy Millions of Users," Forrester, Best Practices, Sep. 10, 2004, pp. 1-11.
Schatt, Stan, "The Mobile Mind," Forrester Big Idea, Jul. 23, 2004, pp. 1-17.
Orlov, Laurie and Ramos, Laura, "Organic Information Abstraction," Forrester Big Idea, May 12, 2004, pp. 1-15.
Ramos, Laura and Rasmus, Daniel W., "Best Practices in Taxonomy Development and Management," Planning Assumption, Giga Information Group, Inc., Jan. 8, 2003, pp. 1-11.
Harris et al., "Taxonomy Creation: Bringing Order to Complexity," Gartner, Inc., Sep. 10, 2003, pp. 1-6.
Brand, John et al., "When Too Much Content is Barely Enough," Meta Delta, Jan. 29, 2003, pp. 1-4.
Zetie, Carl and Barnett, Liz, "Why Enterprise Application Development is So Hard—And How it Must Get Easier," Forrester, Trends, Aug. 20, 2004, pp. 1-11.
'Business Process Management with SAP NetWeaver' [online]. SAP AG, publication date unavailable, [retrieved on Dec. 27, 2005]. Retrieved from the Internet: <URL: http://www.sap.com/solutions/netweaver/pdf/BWP_NetWeaver_BPM.pdf>.
'User Productivity Enablement with SAP NetWeaver' [online]. SAP AG, publication date unavailable, [retrieved on Dec. 27, 2005]. Retrieved from the Internet: <URL: http://www.sap.com/solutions/netweaver/pdf/BWP_SB_User_Productivity_Enablement.pdf>.
'Business Drives Technology: SAP Fuels the Next Bold Move in Software' [online]. SAP AG, publication date unavailable, [retrieved on Dec. 27, 2005]. Retrieved from the Internet: <URL: http://www.sap.com/solutions/netweaver/pdf/BWP_NetWeaver_Overview.pdf>.
'Enterprise Compensation Management with mySAP ERP' [online]. SAP AG, publication date unavailable, [retrieved on Dec. 27, 2005]. Retrieved from the Internet: <URL: http://www.sap.com/solutions/business-suite/erp/pdf/BWP_SID_Enterprise_Compensation.pdf>.
'Development environment' [online]. IBM, publication date unavailable, [retrieved on Dec. 27, 2005]. Retrieved from the Internet: <URL: http://www.research.ibm.com/elite/IDE/ide.html>.
'Platform Architecture' [online]. $EMC^2$, publication date unavailable, [retrieved on Dec. 27, 2005]. Retrieved from the Internet: <URL: http://www.documentum.com/products/platform/index.htm>.
'Web Content Management' [online]. Interwoven, publication date unavailable, [retrieved on Dec. 27, 2005]. Retrieved from the Internet: <URL: http://www.interwoven.com/solutions/wcm/index.html>.
'Taxonomy Warehouse' [online]. Synapse, the Knowledge Link Corporation, publication date unavailable, [retrieved on Dec. 27, 2005]. Retrieved from the Internet: <URL: http://www.taxonomywarehouse.com/querybycat.asp>.
'Inxight Star Tree Demos' [online]. Inxight, publication date unavailable, [retrieved on Dec. 27, 2005]. Retrieved from the Internet: <URL: http://www.ischool.washington.edu/tabrooks/424/OrganizationalMetaphors/StarTrees/Inxight...>.

* cited by examiner

USER INTERFACE (UI) PROTOTYPE USING UI TAXONOMY

TECHNICAL FIELD

The description relates to a user interface (UI) taxonomy that is an abstraction of a class of UIs that is consistent with a UI layout and a UI principle of the UI taxonomy.

BACKGROUND

Many software companies today regulate the creation of user interfaces for their products, for example through guidelines or other rules or that apply to graphical user interfaces (GUI). The guidelines may stem from a desire to make the GUI user-friendly, from a technical restriction in the implemented system, or from legislation that requires the GUI to be accessible to the visually impaired, to name a few examples. Such guidelines are sometimes very extensive which means that it may be difficult for the individual designer to learn them in their entirety so that they can be applied in the design process. Also, the guidelines may change from time to time so there is a need for timely updates. UI guidelines have been provided to the designer in hard copy or in a form that is otherwise not integrated with the design/development environment, for example by storing them in a file of the computer system.

It happens that developers and designers violate UI rules and standards. Sometimes this is inadvertent, such as when the designer or developer is not aware of the specific rule that applies. First, it may be difficult or impossible to incorporate into the development of UIs ever-growing usability guidelines that convey very large amount of rules and concepts. Second, changes made to these usability guidelines may be overlooked and therefore not considered in the UI developments. Legal requirements regarding accessibility direct public entities to make their software accessible to disabled users. Other industry-specific UI standards may also be or become legal prerequisite in software.

In other situations, the designer or developer ignores a certain guideline believing that it does not apply, or because compliance would require substantial effort. This scenario sometimes occurs in organizations where a large number of UI requirements are posted without sufficient efforts in integrating them with each other or making sure they are consistent. As a result, some applications are created with UIs that contain errors, inconsistencies or other defects. Accordingly, problems may result when requirements and guidelines are not taken into account in UI work.

SUMMARY

The invention relates to organizing user interface information.

In a first general aspect, a method of organizing user interface information in a computer system includes receiving a user's definition of at least a user interface (UI) layout and a UI principle, and creating a UI taxonomy that is an abstraction of a class of UIs being consistent with the UI layout and the UI principle.

Implementations may include any or all of the following features. The user may further create, using the UI taxonomy, a UI prototype that is an instance of the class. Creating the UI prototype may include selecting the UI layout taking the UI principle into account, linking the UI environment and the UI style to the UI prototype. The UI prototype may be provided with at least one UI pattern and a UI topology that are included in the UI layout. The UI prototype may be provided to a developer for creating an application using application development software. The UI layout may include at least a UI pattern or a UI topology. The UI principle may include at least a UI concept or a UI rule. When the UI principle includes the UI concept the method may further include automatically verifying whether a UI complies with the UI concept, and taking a predefined action if the UI does not comply with the UI concept. The predefined action may include using the automatic verification and the UI concept to generate a message stating how the UI does not comply with the UI concept. The automatic verification may be initiated in the computer system by one selected from the group consisting of: (a) a UI designer working in a design environment, wherein the UI belongs to a UI prototype, and (b) a developer working in an application development environment, wherein the UI belongs to an application. When the UI principle includes the UI rule the method may further include automatically verifying whether a UI complies with the UI rule, and taking a predefined action if the UI does not comply with the UI rule. The predefined action may include reformatting the UI to comply with the UI concept. The automatic verification may be initiated in the computer system by one selected from the group consisting of: (a) a UI designer working in a design environment, wherein the UI belongs to a UI prototype, and (b) a developer working in an application development environment, wherein the UI belongs to an application. When the user's definition further includes a UI environment, the class of UIs may be consistent also with the UI environment. When the user's definition further includes a UI style, the class of UIs may be consistent also with the UI style.

In a second general aspect, a computer system includes an application development software for a developer to create an application having a user interface (UI), and a UI taxonomy including a UI layout and a UI principle, the UI taxonomy being an abstraction of a class of UIs. The computer system provides a UI prototype to the developer in creating the UI for the application, the UI prototype being created using the UI taxonomy.

Implementations may include any or all of the following features. The computer system may provide the UI taxonomy to the developer using a plug-in application in application development software. UI controls may be associated with the UI taxonomy, the UI controls being abstractions of UI objects that are usable in the UI. The UI taxonomy may further include a UI environment including at least one service that is associated with at least some of the UI controls. The UI taxonomy may further include a UI style sheet that is associated with at least some of the UI controls.

Advantages of the systems and techniques described herein may include any or all of the following: Enabling UI designers and infrastructure developers to organize their information assets, so they can accurately and adequately categorize the usability requirements and standards. Enabling application developers to leverage the usability requirements and standards for fulfilling end-user goals with the developed application.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
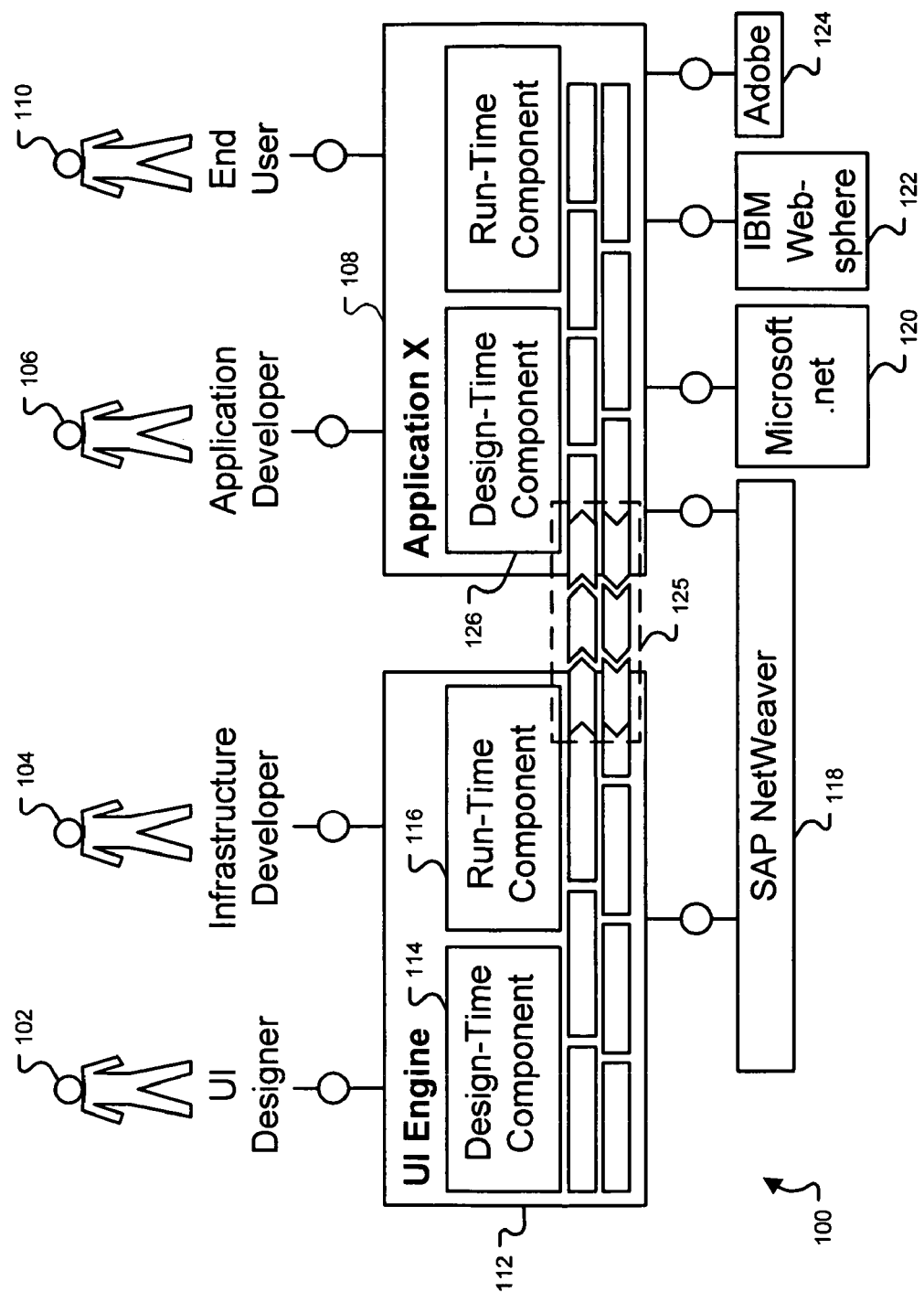
FIG. 1 schematically shows an enterprise system environment in which a UI taxonomy can be used.

FIG. 1 schematically shows an enterprise system environment 100 in which an embodiment of the invention can be used. Particularly, the environment 100 supports creation of a UI prototype or a UI for an application program, each of which complies with a UI layout and a UI principle. The creation is done using a UI taxonomy that is an abstraction of a class of UIs consistent with the UI layout and the UI principle.

The people that are involved in the enterprise system environment 100 may include: at least one UI designer 102 who creates the UI prototype; at least one Infrastructure Developer 104 that creates the infrastructure; at least one application developer 106 that creates an application 108 that has the UI; and at least one end user 110 that uses the application 108. The environment 100 may reside on a single device or may be distributed over several devices.

Particularly, the environment 100 includes a UI engine 112 that the UI designer 102 and the infrastructure developer 104 can use. The UI engine manages the UI layouts, UI principles and UI taxonomies, and can also handle UI environments, UI styles, UI patterns and UI topologies. For example, the UI engine 112 can make a UI requirement available in an organized and comprehensible form or by automatically applying certain requirements to a UI object that the designer is working on.

The implementation of the UI engine constitutes a UI design environment in which designers or developers create and manage UI objects. Particularly, the UI engine includes a design-time component 114 that the UI designer can access to create, change and publish UI objects, develop UI prototypes, build relationships between UI objects, and model UI event-loops, to name a few examples. The UI engine 112 also includes a run-time component 116 that the infrastructure developer 104 can consult to learn about various UI requirements and the rationale for creating particular UI objects. An infrastructure developer may also access the design-time component 112 when technical limitations or new infrastructure concepts are introduced. One example is when a new pattern—a predefined combination and arrangement of UI controls—is to be introduced.

The application 108 may be a so-called enterprise application that can be built and run under any of several platforms, such as a NetWeaver platform 118 available from SAP AG, or other platforms like Microsoft's. Net platform 120, IBM's WebSphere platform 122, or an Adobe platform 124. The application 108 is created in an application development environment such as any integrated development environment (IDE) product available from SAP (NetWeaver Studio), or Microsoft (Microsoft Visual Studio) or Adobe (Adobe Designer).

The application 108 includes a design-time component 126 with which the actual application implementation occurs: the UI is designed and configured using, or under guidance of, the UI prototype created by the UI designer. These and other operations benefit from the existence of a linking element 125 between the UI design environment and the application development environment. The linking element 125 may comprise an integration of the respective environments so that information and logic can be shared and mutually be taken into account in the respective environments. For example, the linking element provides that the at least one UI requirement that is available to the UI designer in the UI design environment is made available to the application developer in the application development environment.

In short, services of the UI engine 112 are available to the application developer and the end user during development and use of the application 108. Particularly, application developers have access to UI objects integrated in the IDE. The end user, in turn, receives an application with a UI that is highly consistent and that has great usability. Moreover, the end user may access on-demand UI help, feedback and other features available directly through the UI engine 112.

Figure 2:
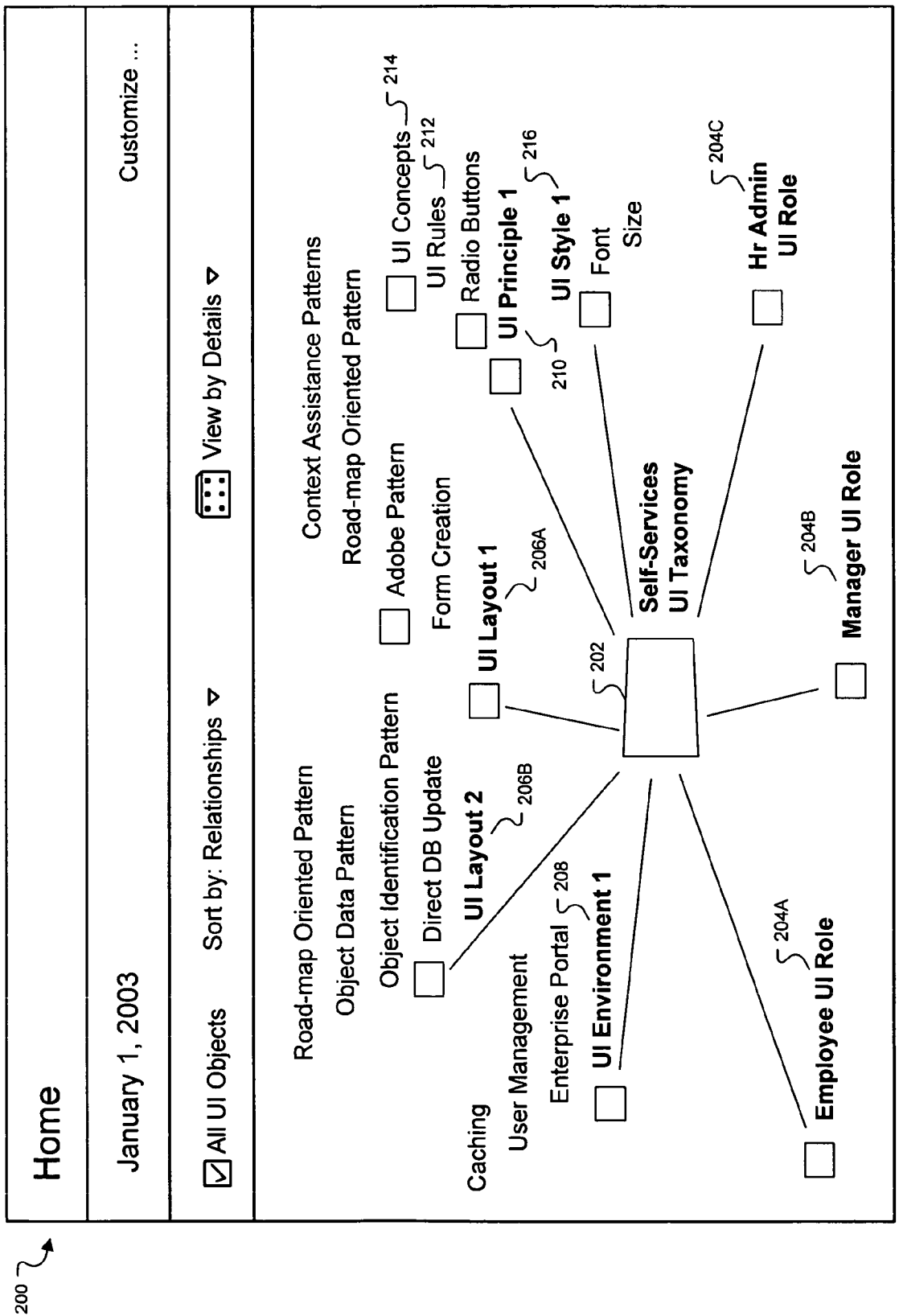
FIG. 2 is an example of a UI taxonomy being presented in a UI taxonomy tool.

FIG. 2 shows an exemplary UI taxonomy tool 200 that can be used in managing UI taxonomies or creating UI prototypes or UIs with the help of a UI taxonomy. The tool 200 can visually represent the UI taxonomies to UI designers in their UI engine front-end tool. This allows the UI designer to grasp the usage and relationships of the UI taxonomy and apply this knowledge in the work.

The tool 200 here shows a particular taxonomy 202 entitled "Self-Services UI Taxonomy". In products from SAP AG in Walldorf (Baden), Germany, "Self-Service" typically refers to an implementation that is configured to let an end user initiate a complex transaction that corresponds to a business process internal to the organization. For example, employers running SAP systems can implement an Employee Self-Service by which their employees enroll in a benefit plan.

The Self-Services UI taxonomy 202 applies to 3 UI roles: an Employee UI role 204A, a Manager UI role 204B and a Human Resources (HR) UI role 204C. By clicking on one of the roles, e.g., the Manager UI role 204B, the user can see any other UI taxonomy in the system that also applies to this role.

The taxonomy 202 includes two UI layouts: a Form Creation layout 206A and a Direct Database (DB) Update layout 206B. UI layouts define how the UI should be set up by serving as a template or floorplan for interaction and navigation. A layout can contain one or more instances of UI patterns. In the above example where the created UI is for benefits enrollment, the layout 206B may correspond to a solution where the employee's interaction with the UI causes a direct update of the relevant database. Similarly, the layout 206A may be used where the UI instead is adapted to provide a form that the user fills out and submits to the HR department.

The taxonomy 202 includes a UI environment 208 that in this example is "Enterprise Portal". UI environments define where the UI layouts and UI principles can be executed for the UI to work properly. A UI environment can contain several instances of services.

The taxonomy 202 includes a UI principle 210. A UI principle defines what UI controls are to be used and the design principle(s) to be followed when creating the UI. A UI principle can contain one or more instances of UI concepts and UI rules. A UI concept is a guideline for recommended UI behavior. A UI rule is a guideline for mandatory UI behavior. By analogy, the UI rule may be viewed as a spelling rule of UI creation, and the UI concept as the grammar thereof. Here, the UI principle 210 includes UI rules 212 and UI concepts 214. Each of the UI concept and the UI rule is related to one or more UI elements that can be used in the UI.

The taxonomy 202 includes a UI style 216. A UI style defines which of several predefined styles is to be used when UI content is delivered.

For the exemplary components 204-216 described above, or any other component of a UI taxonomy shown in the UI taxonomy tool 200, more detailed information can be made available if the user clicks on the corresponding icon.

UI taxonomies can grow very complex depending on the nature of the applications. For example, a UI taxonomy can include two UI environments (e.g., the SAP Portal and SAP Web Dynpro), twelve dependent UI services (e.g., user management, eventing, caching, etc.) and five UI layouts (e.g., direct database update layout, form creation layout, etc.). The UI layouts, in turn, can contain ten UI patterns (e.g., a roadmap oriented pattern and a context assistance pattern to be described below) and five UI topologies. The UI taxonomy can further include ten UI principles (e.g., text, spacing, accessibility, etc) that apply to 20 UI concepts and 25 UI rules (e.g. each UI element must have a tool tip). The UI taxonomy tool 200 provides convenient ways of assembling and managing such a taxonomy and also others that may be more or less complex.

Figure 3:
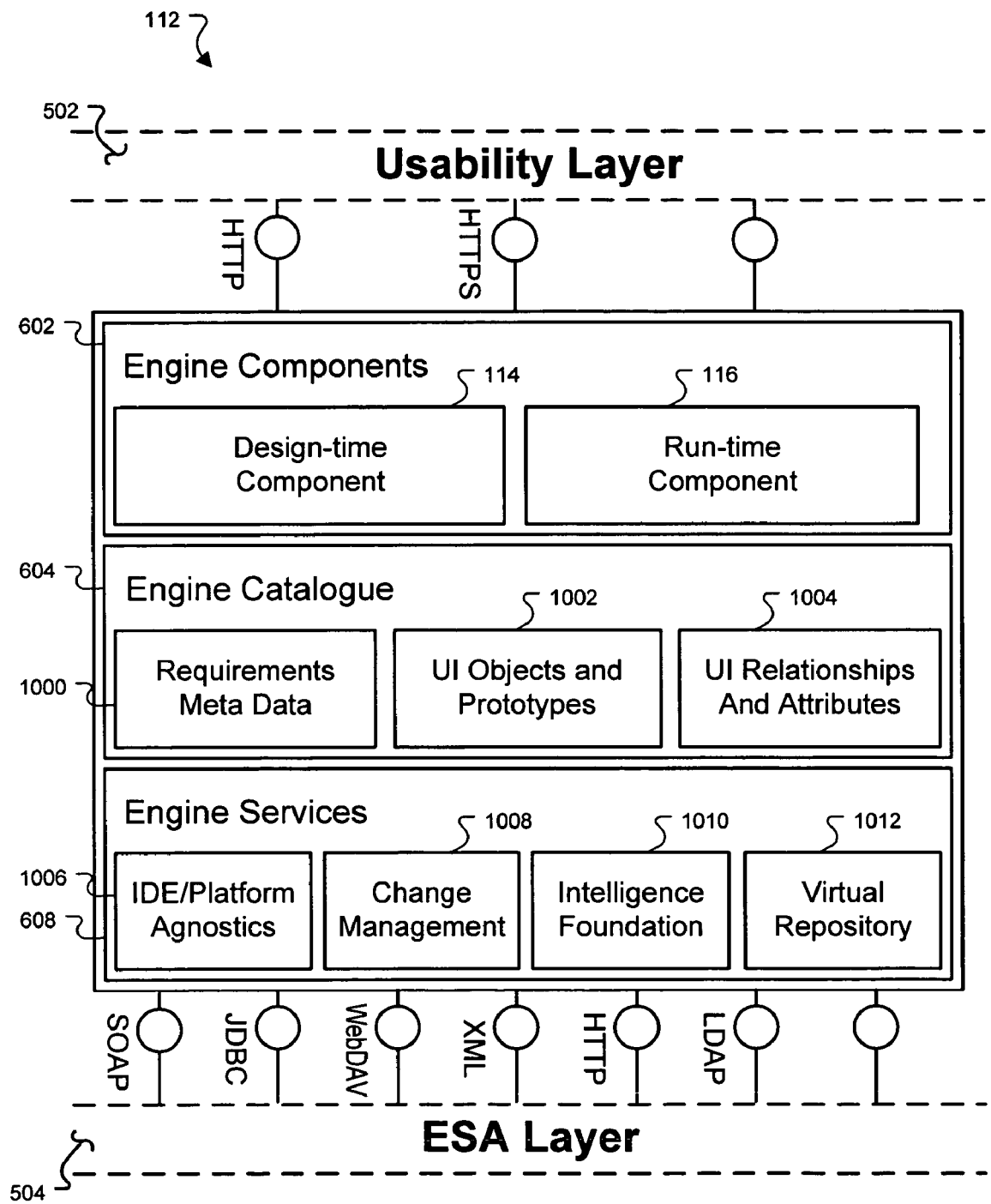
FIG. 3 shows an shows an inside view of an exemplary UI engine.

FIG. 3 shows an exemplary architecture for the UI engine 112 made out of three parts: engine components 602, an engine catalogue 604 and engine services 608. The architecture of the UI engine 112 is shown between a usability layer 502 and an enterprise service architecture (ESA) layer 504. The usability layer 502 relates to anything that the user sees and actively works with in the environment 100. The ESA layer 504 relates to one or more services that are provided to users through the usability layer 502. The ESA layer (or a so-called service oriented architecture layer) may make at least one core application service (not shown) available as a standard-based, platform-independent web service, meaning that it can be accessed from the usability layer using web technology. Beneath the ESA layer 504 there may be a business layer (not shown) relating to the underlying models and software that handles the business data and that can perform a variety of operations. Particularly, the ESA services can use one or more of the operations in such a business layer.

The four roles of users (see FIG. 1) in the system can interact with any or all of the engine components 602 in a design environment. That is, they can interact with the design-time component 114 or with the run-time component 116. The design-time component 114 can be used in generating UI objects and for developing UI prototypes, for example. The run-time component 116 can provide information about UI requirements or UI objects.

The engine catalogue 604 here contains a requirements meta data portion 1000 that includes all the meta-data derived from the UI requirements. The engine catalogue 604 includes a UI objects and prototypes portion 1002. For example, this portion is for the UI objects and UI prototypes generated with the design-time component 114. The engine catalogue also includes a UI relationships and attributes portion 1004 that includes relationships and attributes used by either or both of the design-time component 114 and the run-time component 116.

The engine services 608 are generic services used inside or outside the engine. For example, the engine services may be used in communicating UI rules and concepts to a development tool such as Adobe Designer. This allows the UI engine 112 to work with products of other software vendors to support the development of UIs on third-party platforms. The engine services 608 includes an IDE/platform agnostics portion 1006 that allows the engine 112 to interact with different IDEs or with different platforms. For example, the portion 1006 may provide that the engine 112 interacts with different GUI builders, editors and compilers, to name just a few examples. A change management portion 1008 may manage changes in the UI engine 112. For example, the changes may relate to the UI objects or the UI prototypes.

The engine services 608 includes an intelligence foundation 1010 that may be a technical component built to provide adaptive UI personalization, manage end-user performance metrics, and maintain UI history. In some implementations, the intelligence foundation 1010 provides or interacts with a UI agent software providing a context-aware, affinity-enabled UI that anticipates user needs and assists with goals. The engine services 608 further includes a virtual repository 1012 that allows access to third party UI meta data. This may provide that third-party UI content can be assembled, virtually visualized and adapted, to name a few examples.

Figure 4:
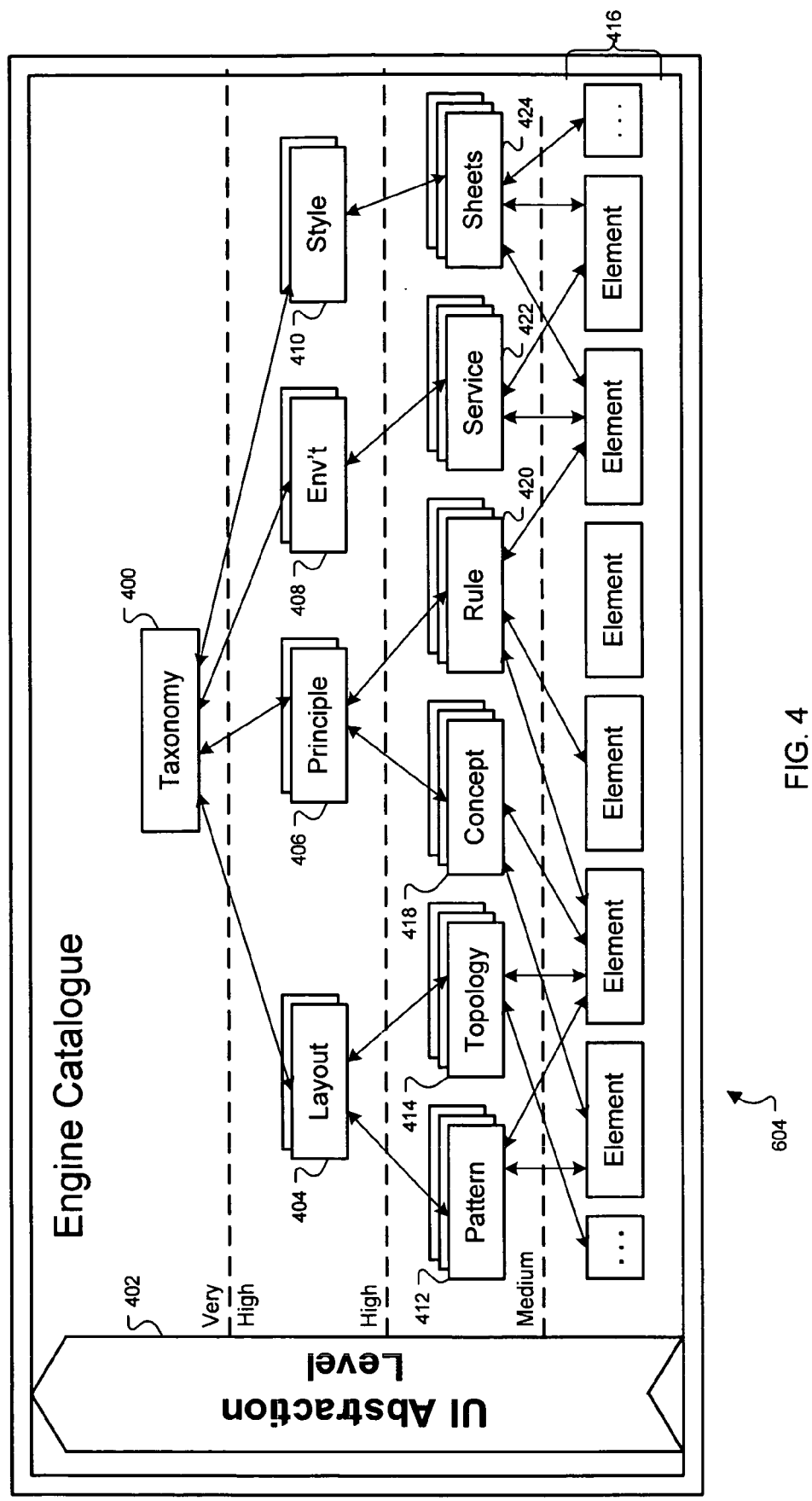
FIG. 4 shows an example of an engine catalogue containing a UI taxonomy.

FIG. 4 shows an example of the engine catalogue 604 that can be used in the environment 100 or in the tool 200. The engine catalogue 604 includes a taxonomy 400 that is a classification scheme of information components (for example, terms, concepts, graphics, sounds, etc.) and their interrelationships. The taxonomy 400 is a hierarchical classification of UI objects and their interrelationships that supports the user in identifying the UI of an application and its features. Here, the taxonomy 400 is hierarchically arranged according to an abstraction level 402 that ranges from very high to low. The taxonomy 400 represents a very high abstraction level of UI objects and it groups together possible Layouts, Principles, Environments and Styles allowed in a UI.

The UI taxonomy 400 can help UI designers and infrastructure developers by providing a placeholder for the meta data arriving from usability or technical UI requirements and standards. Furthermore, the taxonomy 400 can improve consistency and support innovations by application developers while implementing the UI. The UI taxonomy 400 can also provide on-demand help for end-users who have problems understanding the navigation, content or functions of an application.

At the high level of UI abstraction, the taxonomy 400 includes one or more of: a UI layout 404, a UI principle 406, a UI environment 408 and a UI style 410. Examples of the UI layout 404 include the UI layouts 206A and B shown in FIG. 2. Similarly, the UI principle 210 is an example of the UI principle 406, the UI environment 208 an example of the UI environment 408 and the UI style 216 an example of the UI style 410. Each of the UI layout, the UI principle, the UI environment and the UI style can characterize the UI taxonomy and contribute to a definition of a UI class that can be created with the taxonomy. When at least a UI layout and a UI principle are included, the UI taxonomy is an abstraction of a class of UIs that are consistent with the UI layout and the UI principle.

Each layout 404 can include one or more UI patterns 412 and one or more UI topologies 414. The UI patterns and UI topologies are at a medium level of UI abstraction. A UI pattern is an archetype used to perform a task common to a number of applications. A UI topology represents the layout navigation, capturing the possible event-loop of screens/steps/clicks that can be used. Each UI pattern and UI topology can involve one or more UI elements 416, which are situated at a low level of UI abstraction in the taxonomy 400. The UI elements 416 are a low abstraction level of UI objects that are representative of the basic controls available in a UI.

At the low abstraction level, the UI principle 406 can have one or more UI concepts 418 and one or more UI rules 420. The UI concepts 214 and UI rules 212 shown in FIG. 2 are examples of the UI concepts 418 and the UI rules 420, respectively. Each UI concept and UI rule can apply to one or more of the UI elements 416.

The UI environment 408 can include one or more UI services 422 at the medium level of UI abstraction. The UI service is a platform function that makes up part of the runtime environment where taxonomies can work properly. Each UI service can involve one or more of the UI elements 416.

The UI style 410 can include one or more UI sheets 424 at the medium level of UI abstraction. Sheets are the color/fonts/generic features for the delivered UI. Each UI sheet applies to one or more of the UI elements 416.

The UI taxonomy 400 is distilled from the standards and requirements of the usability, business and technical layers of enterprise software as an abstract representation of a class of UIs that are consistent therewith. UI taxonomies can create order in the unstructured world of UI design. UI taxonomies can facilitate a decoupling of front-end design from front-end logic and provide transparency and accountability between the tasks of UI designers and developers. UI taxonomies can also provide automated functions to account for and communicate guidelines to all development participants.

More than one UI taxonomy can be referenced in a software application program. In products from SAP AG, separate UI taxonomies may be implemented for Self-Services, Accessibility, Reporting, Mobile, and other applications. Priorities can be applied, for example by weighting the objects of UI taxonomies. For example, the UI taxonomy for Accessibility may be given the highest priority in any standard enterprise application, and its UI rules and concepts may then take precedence over others.

Figure 5:
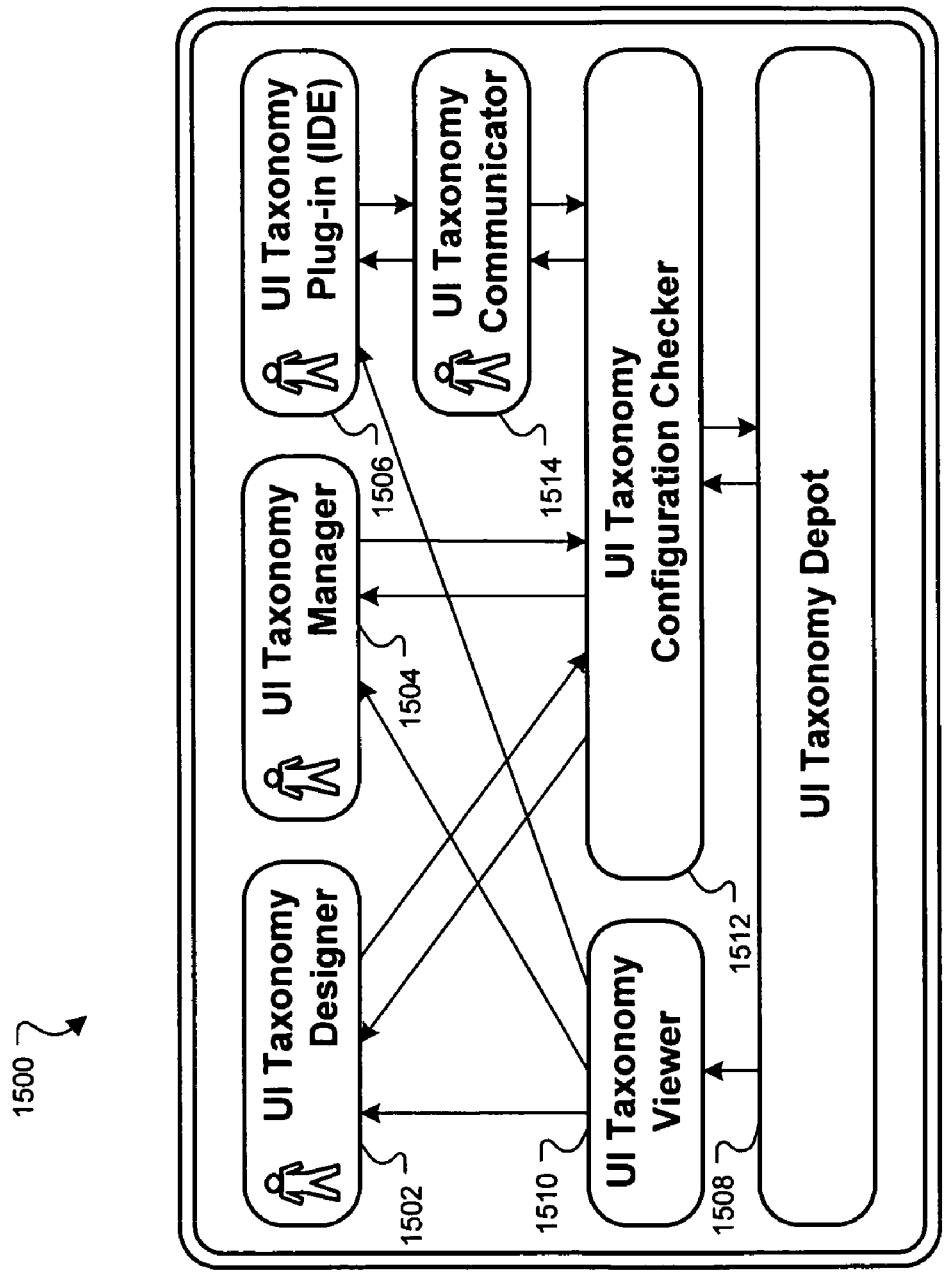
FIG. 5 shows a computer-based relationship involving a UI taxonomy.

FIG. 5 schematically shows a relationship 1500 that can be established when working with a UI taxonomy. For example, the relationship 1500 can exist in the environment 100 in FIG. 1. The relationship 1500 involves, among other entities, a UI taxonomy designer 1502, a UI taxonomy manager 1504, a UI taxonomy plug-in (IDE) 1506 and a UI taxonomy depot 1508. These are components that are present in a designtime environment. Other components will be described below.

The UI taxonomy designer 1502 provides an access-point for UI architects as gate-keepers of the UI guidelines meta data. For example, the UI taxonomy designer 1502 facilitates creation of low-level abstract UI objects such as elements, UI rules and roles. As another example, the UI taxonomy designer 1502 facilitates definition of logical expressions, properties and restrictions for those and other UI objects.

The UI taxonomy manager 1504 provides an access-point for UI designers as the creators of UI requirements and composers of UI prototypes. For example, the UI taxonomy manager 1504 facilitates creation of high-level abstract UI objects such as UI concepts, UI principles and UI layouts. Another example is that the UI taxonomy manager 1504 facilitates maintenance of relationships and documentation behind UI objects. As another example, the UI taxonomy manager 1504 facilitates modeling of UI topologies in the UI based on abstract elements and patterns.

The UI taxonomy plug-in (IDE) 1506 provides that application developers can jumpstart UI development in the right direction, in that they can and do follow UI rules and concepts, and that they can get central help information. The UI taxonomy plug-in (IDE) 1506 also provides that foundation (or infrastructure) developers can add restrictions and properties on UI objects such as UI patterns. For example, the UI taxonomy plug-in (IDE) 1506 provides a communication gate between runtime services of the UI engine 112 and design-time services of an IDE. Such a communication gate may operate in one or more modes. For example:

A proactive mode may involve applying UI layouts (with navigation and mapped elements or patterns) upon UI role selection;

A reactive mode may involve, when IDE commands (such as a reformat UI command or an inspect UI command to be described below) are triggered, making necessary changes according to UI rules and providing recommendations based on UI concepts; and A help mode may involve providing on-demand information about documented UI taxonomies (guidelines) with search capability.

The UI taxonomy plug-in (IDE) 1506 also provides limited access for a user to add or modify UI guidelines and requirements meta data.

The UI taxonomy depot 1508 provides a persistence layer for all abstract UI objects. It also provides enhanced capabilities for UI management, such as for change management, versioning, authoring or workflow. For example, the UI taxonomy depot 1508 facilitates that the user can persist all applicable UI taxonomy meta data. This may involve saving, retrieving or changing the meta data, to name a few examples. The UI taxonomy depot 1508 also provides a UI vocabulary. Such a vocabulary can contain the mappings between abstract and platform-specific UI objects.

The relationship 1500 also involves a UI taxonomy viewer 1510, a UI taxonomy configuration checker 1512 and a UI taxonomy communicator 1514. These components are present in a runtime environment.

The UI taxonomy viewer 1510 facilitates good user comprehension of all the options UI taxonomies require or offer. The UI taxonomy designer 1502, the UI taxonomy manager 1504 and the UI taxonomy plug-in (IDE) 1506 can interact with the UI taxonomy viewer 1510. The UI taxonomy viewer 1510 can interact with the UI taxonomy depot 1508. For example, the UI taxonomy viewer 1510 can provide a human-oriented view of abstract UI objects, such as that shown in the exemplary UI taxonomy tool 200. Human-oriented views may present the UI objects separate and independent from technical complexities of the UI taxonomies. This may be done by providing the user with intuitive navigation through all related UI objects.

The UI taxonomy configuration checker 1512 seeks to avoid that overriding or exceptional situations arise from the various UI contributions. The UI taxonomy configuration checker 1512, on one hand, and the UI taxonomy designer 1502 and the UI taxonomy manager 1504, on the other, can interact with each other in this regard. The UI taxonomy configuration checker 1512 can also interact with the UI taxonomy plug-in (IDE) 1506 through the UI taxonomy communicator 1514. For example, the UI taxonomy configuration checker 1512 can attempt to make the output of the UI engine 112 error-free by maintaining consistency in the UI taxonomies and by resolving conflicts.

The UI taxonomy communicator 1514 engages in communication and data exchange with an IDE and the UI engine 112. The UI taxonomy communicator 1514 can interact with the UI taxonomy plug-in (IDE) 1506 and with the UI taxonomy depot 1508. In this regard, the UI taxonomy communicator 1514 may act as a middleware component. For example, the UI taxonomy communicator 1514 can receive and forward UI roles and UI layout meta data, logical expressions of UI rules, and suggestions based on UI concepts. As another example, the UI taxonomy communicator 1514 can map abstract UI objects to platform-specific elements from the UI vocabulary.

One of the key components in ESA is the ES Builder, a tool by which users can compose Enterprise Services. The tool can be modified to allow the user to associate UI taxonomies with the Enterprise Service to describe the complete look-and-feel of that Enterprise Service. There will now be described an example of how a UI designer can create an appropriate look-and-feel for an Email Service when used within Self-Service applications.

First, the UI designer may select an Enterprise Service like Email from an ESA repository. The UI designer associates existing UI taxonomies like Accessibility and Self-Services with the Email service. The UI designer imports web service definition language (WSDL) data types of the Email service into the UI layout. Next, the UI designer creates a new UI layout in the Self-Services taxonomy with the necessary UI patterns, such as Text Edit. The UI designer then models the UI topology for this layout using Visual Composer, for example by setting-up five navigable screens. The UI object is provided from the UI design environment to the application development environment through the linking element 125.

Figure 6:
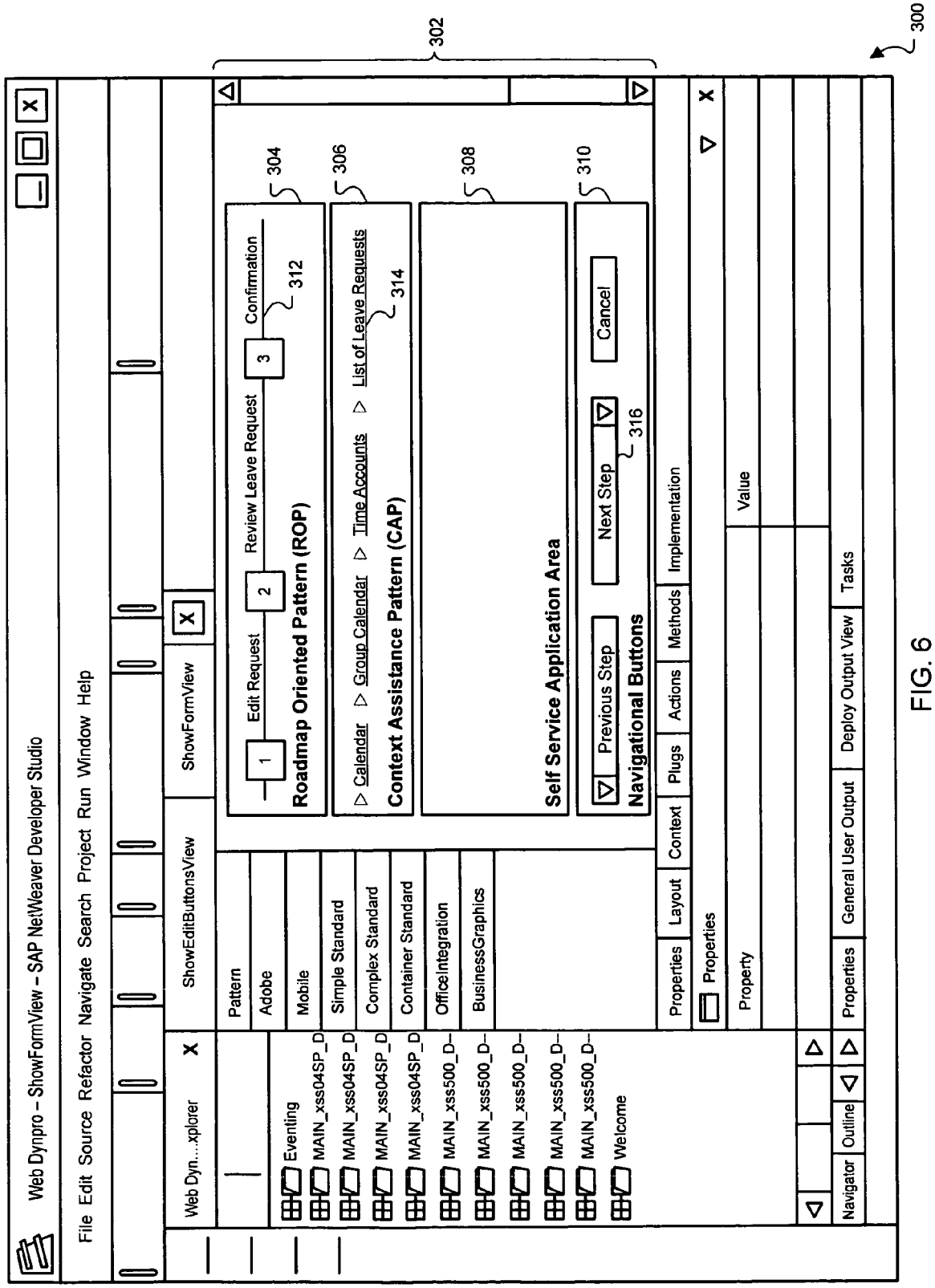
FIG. 6 shows an application development tool in which an application can be created based on a UI taxonomy.

FIG. 6 shows an example of a GUI 300 that can be generated in the application development environment, that is, by an IDE. Here, the GUI 300 is generated by the SAP NetWeaver Studio. The GUI 300 provides the application developer real-time support for application development. An exemplary use of the GUI 300 is that when the application developer starts a new project, the applicable UI taxonomy is selected. A development area 302 in the GUI 300 may let the application developer see a UI object that the UI designer created and use that object in creating the application.

The GUI 300 includes four patterns 304-310. These are examples of the UI patterns 412 that have a medium level of UI abstraction. Particularly, the GUI 300 may be associated with a Self-Service UI taxonomy having a Leave Request UI layout that includes specific UI patterns. The patterns are predefined as part of the infrastructure that is available for creating new applications. Particularly, the pattern 304 is labeled "Roadmap Oriented Pattern" and relates to providing the end user a guided sequence similar to that of a wizard. The pattern 306 is labeled "Context Assistance Pattern" and relates to providing the end user access to context information that may aid the completion of the guided sequence. The pattern 308 is labeled "Self-Service Application Area" and relates to services that allow the end user to perform complex operations in the underlying business software. The pattern 310 is labeled "Navigational Buttons".

The application developer can now create the application that is to include the UI object received from the UI design environment. For example, the developer can include in the pattern 304 an interactive structure 312 that includes individually selectable icons representing one or more steps in the guided sequence. As another example, the developer includes in the pattern 306 one or more links 314 to context information such as a calendar or a list of leave requests. As another example, the developer includes in the pattern 310 one or more icons 316 representing navigation within the guided sequence defined in the pattern 304.

The UI pattern holds the reference to a real pattern or archetype object supplied by a development platform and the UI elements utilized therein. For example, ROP is made out of a Roadmap UI element and three UI elements of the type button. The UI topology suggests navigation in the UI layout and the possible event loop. This can be integrated with an SAP tool such as Visual Composer that designers can use to model these UI topologies.

The UI principles of the UI taxonomy maintain the logical bundle of concepts and rules to be followed in a UI (distilled from the existing UI guidelines). For example, this may include a UI table principle or a UI spacing principle for the Self-Services UI taxonomy. Design practitioners can recommend best practices through the UI concepts, which may be viewed as representing the grammar of UI "writing". An example of a UI principle is: "Do not have more than one table as a UI element in a single screen of any Self-Service application". In contrast, UI rules may be viewed as representing the spelling of UI "writing", which may be a set of requirements established by design practitioners and that must be followed without exception. An example of a UI rule is: "You must have a tool tip maintained behind each UI element as part of the Accessibility UI taxonomy."

A developer who wants to implement an Email Service in a Self-Service application can perform the following steps. First, the developer starts a development project using an IDE of the implementer's choice. The developer then builds a composite application where one of the integrated service is the Email. Next, the developer receives all the UI design meta data available from the UI taxonomy. This may be received in form of existing UI building blocks. The developer binds all the UI elements and UI patterns appropriately to all the contexts and with relevant properties. Finally, the developer codes any remaining front-end logic to fully enable the UI design or to implement any ad-hoc enhancements.

Figure 7:
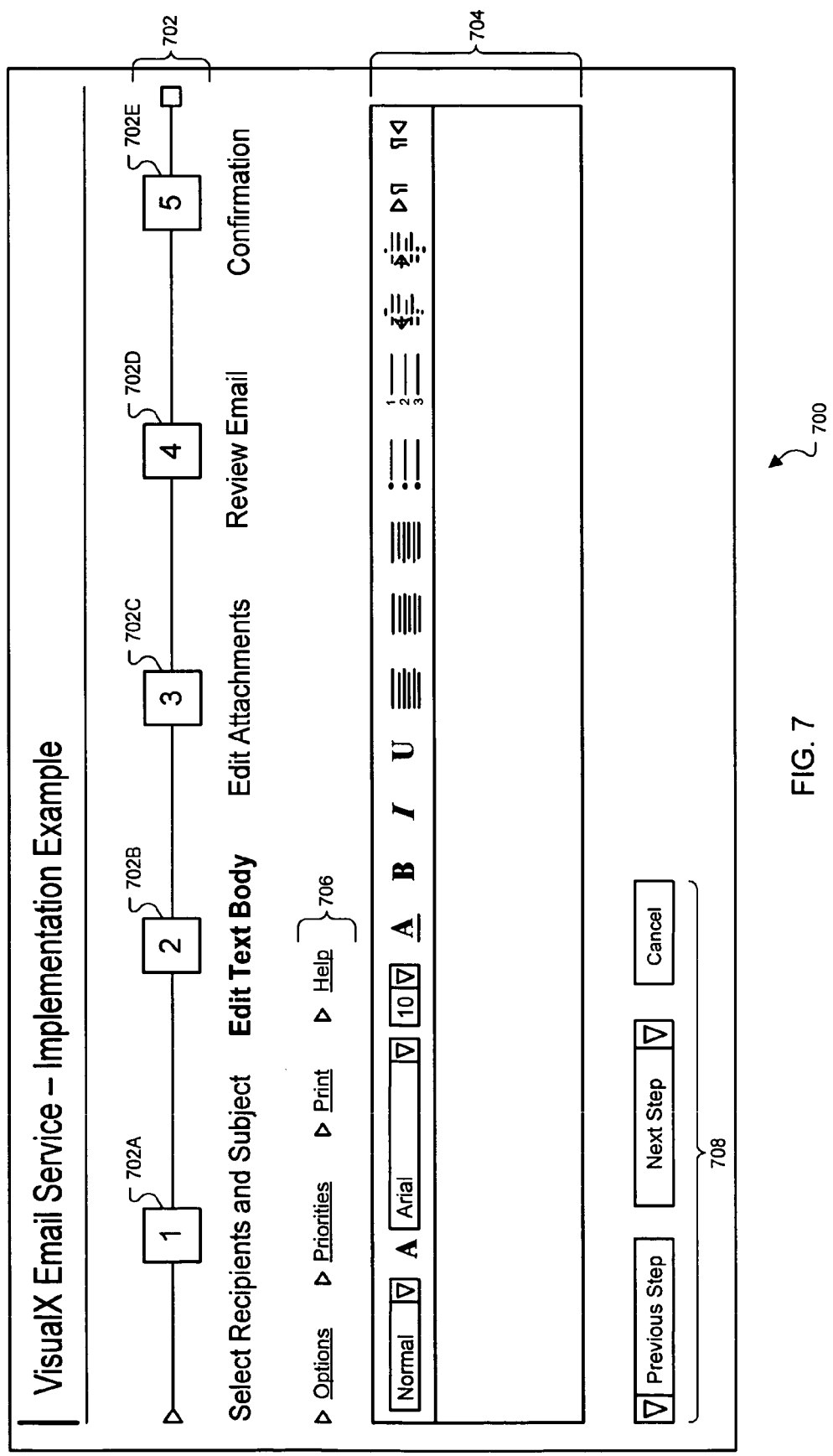
FIG. 7 shows a GUI that is created using a UI taxonomy.

FIG. 7 shows a GUI 700 that is an exemplary end result of such an implementation, the GUI being based on the applicable UI standards and requirements. The GUI 700 includes a guided procedure portion 702 that includes visual representations of steps 702A-E. The procedure 702 indicates that the user would first select email recipients an a subject for the email in step 702A, and thereafter edit the text body in step 702B, the one that is currently active. The user edits the text body in an editing area 704. The GUI 700 also includes a functions area 706 in which the user can trigger specific functions and a navigation area 708 for advancing forward or backward in the guided procedure. Thus, the GUI 700 is an example of how a UI taxonomy can be used in implementing an Email Service in a Self-Service With growing and ever-changing UI guidelines, developers have to cope with the continuous changes they have to make to the UI implementation of the application. Rules can be difficult to apply properly and there may be large numbers of rules to take into account. As a result, software may be delivered that is not compliant with usability standards.

Figure 8:
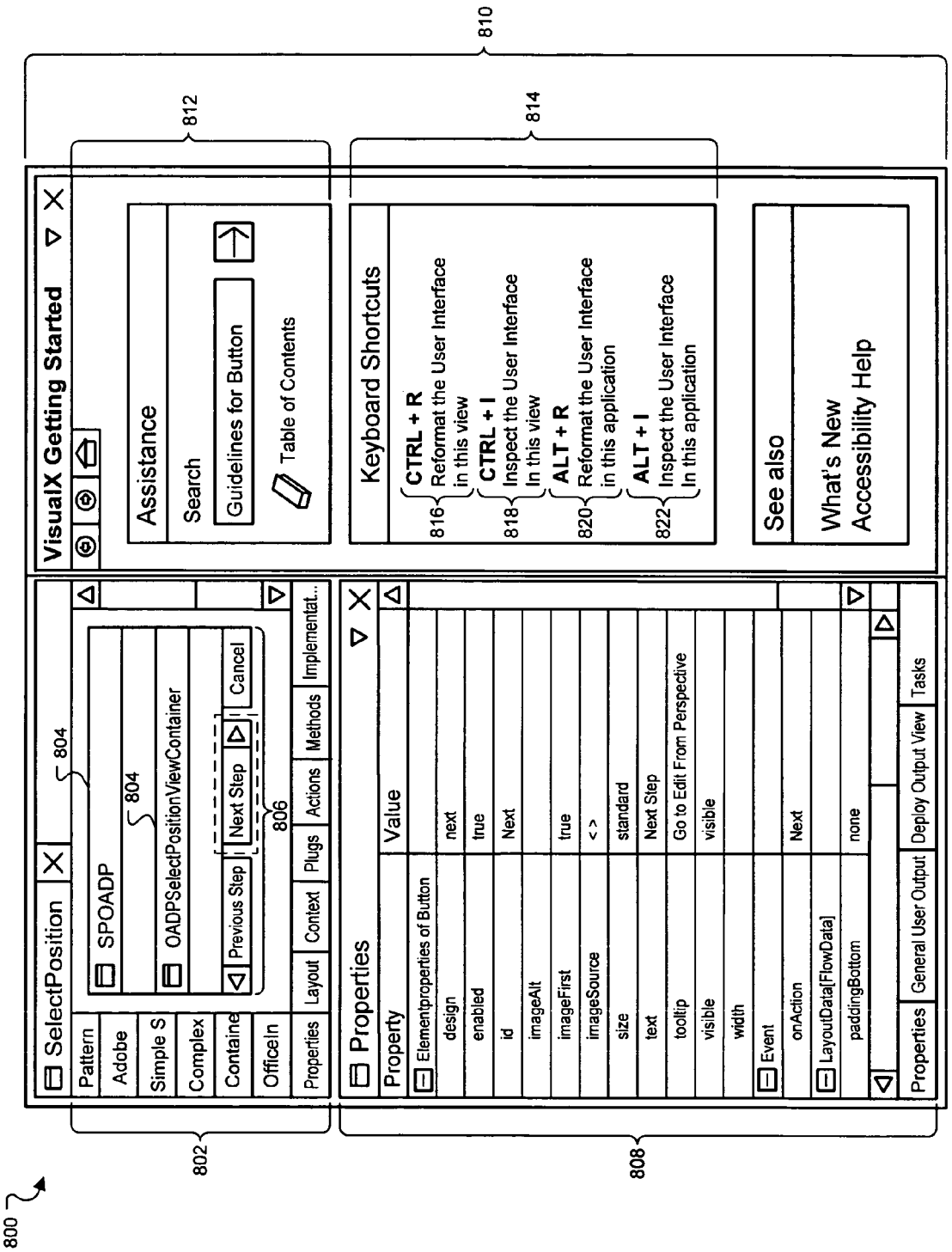
FIG. 8 shows a plug-in tool for checking a UI against a UI taxonomy.

The UI taxonomy also can be used in evaluating a created UI as will now be described with regard to FIG. 8, which shows an exemplary GUI 800. Developers can be provided with automatic functions in their respective development environments to check for all the UI rules or UI concepts coming from applicable UI guidelines. Particularly, the evaluation may result in an automatic modification of the GUI or in generating a notice to the user. The GUI 800 can be generated using the UI taxonomy plug-in (IDE) 1506 (see FIG. 5).

The GUI 800 can be generated for the infrastructure developer 104 to develop infrastructure with which UI objects created using the UI engine are to be used. The GUI 800 is considered an infrastructure development environment and may be generated by an IDE program. The GUI 800 provides access to information from the UI engine, as well as search/review/compare features that can be applied to one or more of the UI objects.

Here, the infrastructure developer has defined, in an area 802, that the infrastructure includes a pair of patterns 804 being displayed simultaneously and that there is a navigation function 806 for the end user to move through a sequence of other patterns or other UI features. In an area 808, the infrastructure developer can maintain properties of buttons to be displayed in, events to occur in, and layout data to be used in generating, the final UI of the application, to name some examples. The infrastructure developer 104 can see the UI object that the designer has created.

An area 810 of the GUI 800 provides the infrastructure developer access to some or all features of the UI engine 112. For example, an area 812 lets the developer search for guidelines that apply to the creation of the UI object(s). Such guidelines may be the source of the UI requirement that was applied in the creation of the UI object. Accordingly, the UI requirement can be provided to the infrastructure developer upon request.

An area 814 lists one or more keyboard shortcuts that the infrastructure developer can use in the GUI. A first shortcut 816 relates to applying one or more UI rules to the UI in this view. This feature is referred to as "Reformat UI" in the following. A second shortcut 818 relates to applying one or more UI concepts to the UI in this view. This feature is referred to as "Inspect UI". The shortcuts 816 and 818 relate to checking the UI in the view provided by the GUI 800, as opposed to checking it in a particular application.

Developers can execute the Reformat UI feature when they want to check compliance with the UI rules. This causes all the necessary UI meta data from that particular UI implementation to be forwarded to the UI engine 112. The engine 112, in turn, checks the compliance against all UI rules. Based on the result of that evaluation, the engine 112 can do the following:

Automatically reformat the meta data of the UI implementation in real-time according to the UI rules; i.e., enforce the rule by implementing a change in the UI; or Generate a reporting message for each violation of the UI rule(s); i.e., notify the user without automatically making any changes in the UI.

For example, the Reformat UI procedure can go through all the UI elements of the implementation and verify, for each one, whether there is compliance with the UI rule(s). This evaluation can involve verifying that the UI complies with rules accessibility (such as availability of tool-tips), to name one example. If there is found to be a breach, the UI engine 112 can cause the UI implementation to be modified with regard to the particular element(s) violating the rule. If some UI rules are based on usability requirements that do not make business sense for the particular developer to incorporate in the UI, then the developer can request that an exception be approved.

The shortcut 818 can be used for triggering the Inspect UI procedure. This provides developers an automatic evaluation in their respective development environments to check the UI against all applicable UI concepts coming from relevant UI guidelines. The Inspect UI feature can be executed when developers want to determine compliance with these sometimes complex usability requirements. This causes all the necessary UI meta data from that particular UI implementation to be communicated to the UI engine 112. The UI engine, in turn, evaluates the UI against the UI concepts. Then, the UI engine provides recommendation to the user regarding the evaluation. The recommendation may be generated in form of an informational message identifying where the UI fails to conform with the UI concept(s). These messages may be viewed as recommendations for better UI design, and are not tied to an automatic modification of the UI or any element therein.

The area 814 also includes another Reformat UI shortcut 820 and another Inspect UI 822. These shortcuts relate to checking the UI in this particular application, and not merely in the particular GUI 800.

Figure 9:
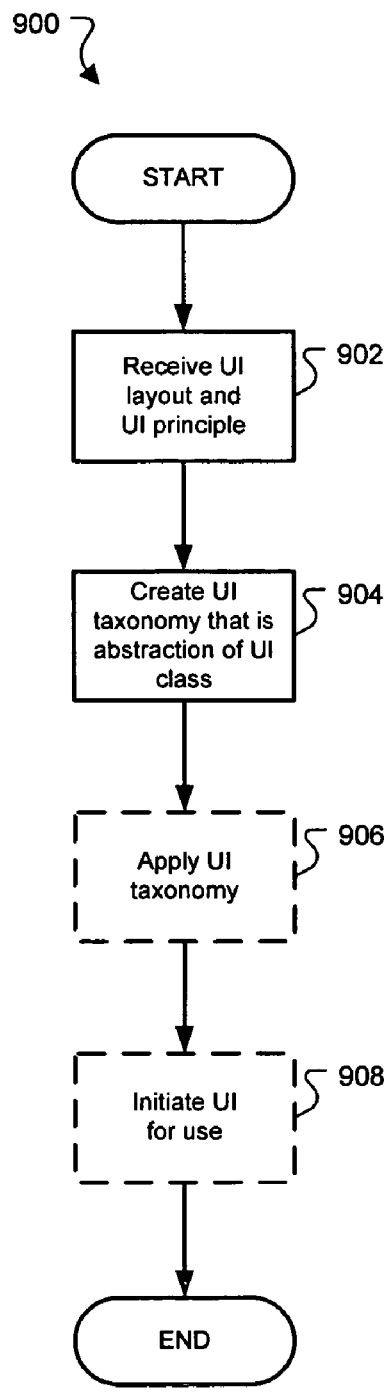
FIGS. 9 and 10 show flow charts of exemplary methods.

FIG. 9 shows a flow chart of an exemplary method 900 of organizing UI information. The method 900 can be performed using a computer program product, that is, by a processor executing instructions stored in a computer readable medium. The method 900 includes receiving a user's definition of at least a UI layout and a UI principle in step 902. For example, the user may define either or both of the UI layouts 206A and B, and the UI principle 210, shown in FIG. 1.

The method includes creating, in step 904, a UI taxonomy that is an abstraction of a class of UIs being consistent with the UI layout and the UI principle. For example, the UI taxonomy 202 can be created. The UI taxonomy 202 may be organized similar to the engine catalogue 604 shown in FIG. 4.

The method optionally includes applying the UI taxonomy in optional step 906. For example, the UI taxonomy can be applied in generating the GUI 700. As another example, the UI taxonomy can be applied in using the UI rule(s) or UI concept(s) thereof as part of the Reformat UI or the Inspect UI.

The method optionally includes, in optional step 908, initiating the UI for use. For example, the UI 700 can be implemented as shown in FIG. 7. As another example, a UI can be implemented with changes that result from discovering rule non-compliance during a Reformat UI operation.

Figure 10:
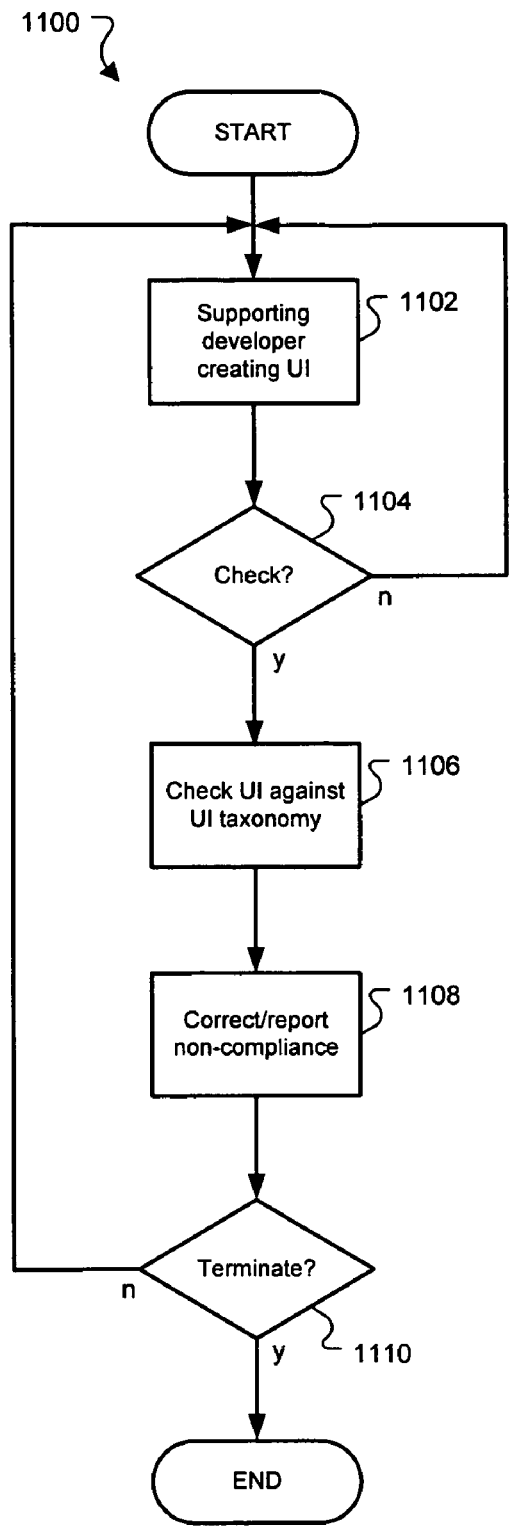

FIG. 10 shows a flow chart of an exemplary method 1100 of using a UI taxonomy. The method 1100 can be performed using a computer program product, that is, by a processor executing instructions stored in a computer readable medium. The method 1100 includes supporting a developer in creating a UI in step 1102. For example, the UI taxonomy tool 200 provides that the developer can overview the UI taxonomy 202. As another example, the developer can assemble UI patterns from a UI taxonomy using the GUI 300.

The method includes determining, in step 1104, whether the UI is to be checked against the UI taxonomy. For example, the determination may involve checking whether the user enters any of the shortcuts in the area 814. If no request for checking is received, the method returns to step 1102.

If a request for checking is received, the method continues with step 1106, in which the UI is checked against the UI taxonomy. For example, the UI may be evaluated against one of the UI rules 212 or the UI concepts 214. The results of the evaluation are recorded in association with the UI.

The method includes correcting, or reporting, any non-compliance in step 1108. For example, errors are corrected in Reformat UI while the user is notified of errors in Inspect UI. If the UI is found compliant with the UI taxonomy in step 1106, step 1108 may be omitted or a message stating the compliance can be generated.

In step 1110, the method determines whether to terminate or to return to step 1102. For example, the user can terminate using the close button of the GUI 800.

Figure 11:
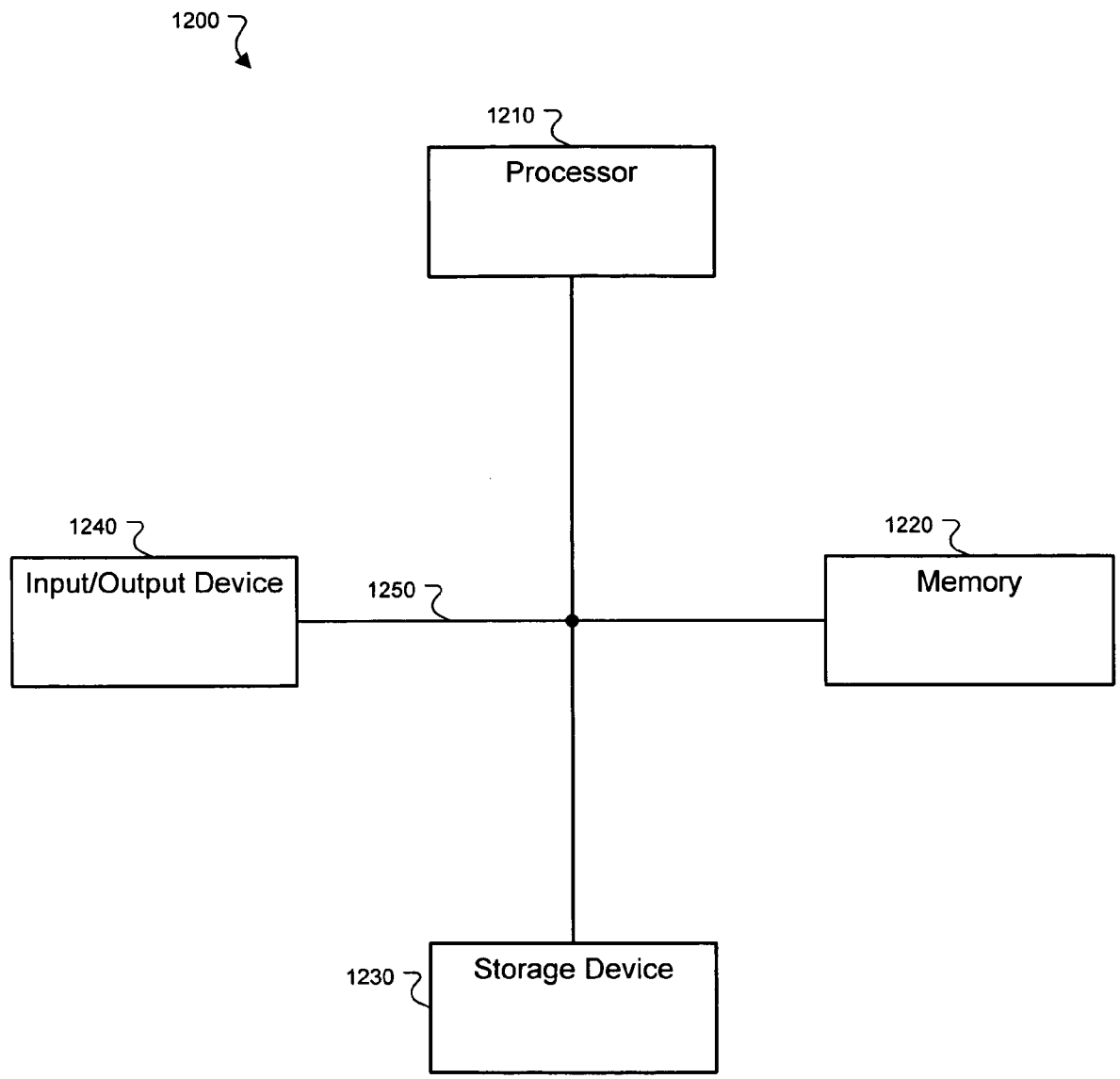
FIG. 11 is a block diagram of a general computer system.

FIG. 11 is a block diagram of a computer system 1200 that can be used in the operations described above, for example in the environment 100. The system 1200 includes a processor 1210, a memory 1220, a storage device 1230 and an input/output device 1240. Each of the components 1210, 1220, 1230 and 1240 are interconnected using a system bus 1250. The processor 1210 is capable of processing instructions for execution within the system 1200. In one embodiment, the processor 1210 is a single-threaded processor. In another embodiment, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one embodiment, the memory 1220 is a computer-readable medium. In one embodiment, the memory 1220 is a volatile memory unit. In another embodiment, the memory 1220 is a non-volatile memory unit.

The storage device 1230 is capable of providing mass storage for the system 1200. In one embodiment, the storage device 1230 is a computer-readable medium. In various different embodiments, the storage device 1230 may be a floppy disk device, a hard disk device, an optical disk device, or a tape device.

The input/output device 1240 provides input/output operations for the system 1200. In one embodiment, the input/output device 1240 includes a keyboard and/or pointing device. In one embodiment, the input/output device 1240 includes a display unit for displaying graphical user interfaces. For example, the input/output device can generate any or all GUIs described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The Invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, the method comprising:
    receiving a user's definition of at least a user interface (UI) layout and a UI principle for one or more user interfaces, the UI principle comprising a UI rule associated with a mandatory UI behavior and the UI principle comprising a UI concept associated with a recommended UI behavior;
    creating a UI taxonomy that is an abstraction of a class of UIs consistent with the UI layout and the UI principle;
    generating a UI prototype using the UI taxonomy, the UI prototype being an instance of the class of UIs;
    providing the UI prototype for use in creating, in response to a user control, a UI for an application;
    automatically verifying whether the UI for the application complies with the UI rule;
    upon automatic verification that the UI for the application does not comply with the UI rule, automatically reformatting the UI for the application to comply with the UI rule;
    automatically verifying whether the UI for the application complies with the UI concept; and
    upon automatic verification that the UI for the application does not comply with the UI concept, performing a predefined action, the predefined action comprising generating a message stating how the UI for the application does not comply with the UI concept.

2. The method of claim 1, wherein the generating a UI prototype using the UI taxonomy comprises selecting the UI layout taking the UI principle into account, linking a UI environment and a UI style to the UI prototype.

3. The method of claim 1, wherein the providing the UI prototype comprises transferring the UI prototype to an application development software.

4. The method of claim 1, wherein the UI layout comprises at least a UI pattern or a UI topology.

5. The method of claim 4, wherein the UI prototype is provided with at least the UI pattern and the UI topology that are included in the UI layout.

6. The method of claim 1, wherein the automatically verifying whether the UI for the application complies with the UI concept is initiated by one selected from a group consisting of:
   (a) a UI designer working in a design environment, wherein the UI belongs to a UI prototype; and
   (b) a developer working in an application development environment, wherein the UI belongs to an application.

7. The method of claim 1, wherein the automatically verifying whether the UI for the application complies with the UI rule is initiated in the computer system by one selected from a group consisting of:
   (a) a UI designer working in a design environment, wherein the UI belongs to a UI prototype; and
   (b) a developer working in an application development environment, wherein the UI belongs to an application.

8. The method of claim 1, wherein the user's definition further includes a UI environment and wherein the class of UIs is consistent also with the UI environment.

9. The method of claim 1, wherein the user's definition further includes a UI style and wherein the class of UIs is consistent also with the UI style.

10. A non-transitory computer-readable storage medium including instructions that, when executed by a computer, cause the computer to perform:
   receiving a user's definition of at least a user interface (UI) layout and a UI principle for one or more user interfaces, the UI principle comprising a UI rule associated with a mandatory UI behavior and the UI principle comprising a UI concept associated with a recommended UI behavior;
   creating a UI taxonomy that is an abstraction of a class of UIs consistent with the UI layout and the UI principle;
   generating a UI prototype using the UI taxonomy, the UI prototype being an instance of the class of UIs;
   providing the UI prototype for use in creating, in response to a user control, a UI for an application;
   automatically verifying whether the UI for the application complies with the UI rule;
   upon automatic verification that the UI for the application does not comply with the UI rule, automatically reformatting the UI for the application to comply with the UI rule;
   automatically verifying whether the UI for the application complies with the UI concept; and
   upon automatic verification that the UI for the application does not comply with the UI concept, performing a predefined action, the predefined action comprising generating a message stating how the UI for the application does not comply with the UI concept.

11. A computer system comprising:
   an input and output (I/O) device; and
   a memory;
   a processor communicatively coupled with the I/O device and the memory, wherein the processor is operable to:
      receive via the I/O device a user's definition of at least a user interface (UI) layout and a UI principle for one or more user interfaces, the UI principle comprising a UI rule associated with a mandatory UI behavior and the UI principle comprising a UI concept associated with a recommended UI behavior;
      create a UI taxonomy that is an abstraction of a class of UIs consistent with the UI layout and the UI principle;
      generate a UI prototype using the UI taxonomy, the UI prototype being an instance of the class of UIs;
      providing the UI prototype for use in creating, in response to a user control, a UI for an application;
      automatically verify whether the UI for the application complies with the UI rule;
      upon automatic verification that the UI for the application does not comply with the UI rule, automatically reformat the UI for the application to comply with the UI rule;
      automatically verify whether the UI for the application complies with the UI concept; and
      upon automatic verification that the UI for the application does not comply with the UI concept, perform a predefined action, the predefined action comprising generating a message stating how the UI for the application does not comply with the UI concept.

12. The computer system of claim 11, wherein the UI taxonomy is provided in a plug-in module.

13. The computer system of claim 11, wherein the UI taxonomy is associated with UI controls, the UI controls being abstractions of UI objects that are usable in the UI.

14. The computer system of claim 13, wherein the UI taxonomy further includes a UI environment including at least one service that is associated with at least some of the UI controls.

15. The computer system of claim 13, wherein the UI taxonomy further includes a UI style sheet that is associated with at least some of the UI controls.

* * * * *